UNITED STATES PATENT OFFICE.

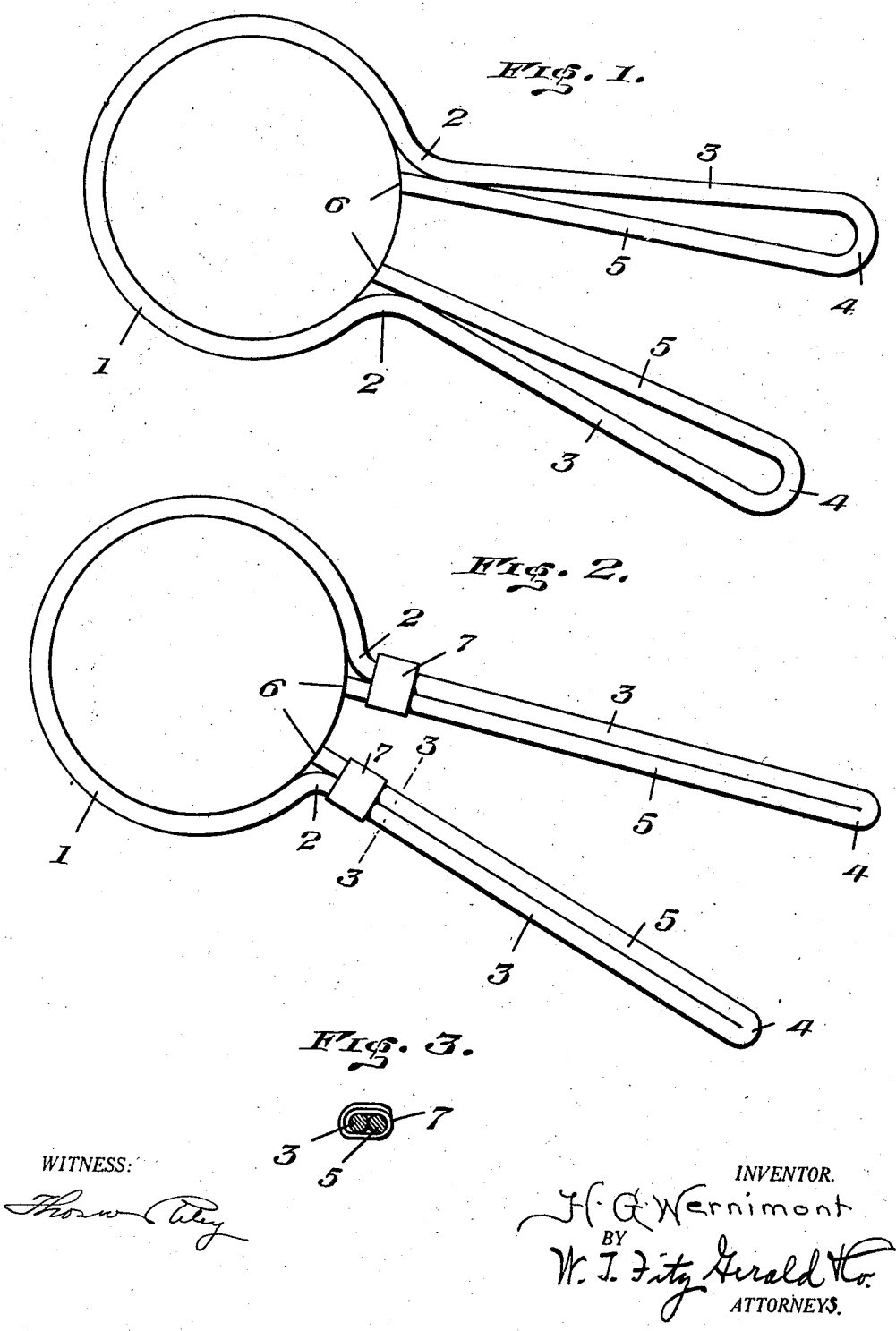

HENRY G. WERNIMONT, OF WASHINGTON, DISTRICT OF COLUMBIA.

JAR OPENER OR WRENCH.

1,330,505.      Specification of Letters Patent.      Patented Feb. 10, 1920.

Application filed January 16, 1919. Serial No. 271,387.

*To all whom it may concern:*

Be it known that I, HENRY G. WERNIMONT, a citizen of the United States, residing at Washington, District of Columbia, have invented certain new and useful Improvements in Jar Openers or Wrenches; and I do hereby declare the following to be a full, clear, and exact description of the invention, such as will enable others skilled in the art to which it appertains to make and use the same.

The present invention relates to jar openers or wrenches, such as are used for opening fruit jars having screw tops, and it is the primary object of the invention to provide a novel and improved wrench of that character which may be manufactured at small cost, and which will nevertheless be thoroughly efficient and practical in use.

A further object is the provision of such a jar opener or wrench which may be readily bent or formed from a single length of rod, wire or other suitable stock, and which is provided with novel means to be grasped by the hand for causing the wrench to embrace the jar or cap, and novel means whereby slippage is prevented, the device having effective means for causing it to bite or grip the jar or cap.

With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawing, wherein:—

Figure 1 is a plan view of the jar opener or wrench, showing one form thereof.

Fig. 2 is a similar view illustrating a modified form.

Fig. 3 is a sectional detail taken on the line 3—3 of Fig. 2.

As shown in Fig. 1, the tool is bent from a single length of rod, stout wire or other suitable stock, the intermediate portion of which forms a clamping or gripping loop 1 that extends through an arc of over 180 degrees, so as to embrace the jar or its cap, it being understood that a pair of these devices can be used, one for holding the jar, and the other for unscrewing or tightening the cap. From the ends of the loop or ring 1, the stock is bent outwardly, as at 2, and extends radially from the loop 1 to provide the handle portions 3, and from the outer ends of the portions 3 the stock is bent back or looped, as at 4, with the terminal portions 5 projecting inwardly between and adjacent to the handle portions 3 and converging to the bends 2, with respect to the portions 3. The portions 3 and 5 thus constitute a pair of handles which can be readily grasped in the hand to force the handles toward one another for contracting the loop 1 so that it will tightly embrace the jar or cap. The portions 5 preferably contact with the bends 2 and the ends 6 of the stock project to the circle of the inner periphery of the loop 1, so that said ends 6 will abut the side of the jar or cap between the ends of the loop 1, as seen in Fig. 1. The device can be readily bent from a suitable length of stock and may be made in various sizes, the loop 1 normally expanding sufficiently to permit it to slip over the jar or cap easily. The various portions of the device are all in a common plane, and the device is comparatively rigid, the resiliency being in the loop 1 and bends 2.

In using the tool, after the loop 1 is placed on the object to be held or turned, the handles are grasped and moved toward one another by the pressure of the hand, thus contracting the loop 1 onto the object. At the same time, the movement of the handles toward one another, will force the ends 6 of the gripping portions 5 inwardly toward the center of the loop 1, whereby the ends or fingers 6 will tightly abut the object and bite or grip the same in a most effective manner, so as to prevent slippage between the tool and object in either direction, it being noted that the two handles and their gripping means are reversed or right and left handed. When the ends 6 of the tool abut the object, the tool can spring at the bends 2 between the loop 1 and handles, so that the pressure resulting from the movement of the handles toward one another, will thrust the ends 6 tightly against the object, by the inward endwise movement of the portions 5. This results in the object being tightly gripped, to prevent slipping, and as either the tool or object is turned, the ends 6 will bite or bind against the object. As a result, the tool enables the user to obtain a positive hold on the jar or cap, and the objects aimed at thus carried out in a simple and efficacious manner.

In the modified form shown in Fig. 2, the formation of the tool is somewhat the same, excepting that the portions 3 and 5 extend side by side in contact from end to end, instead of being open loop form, as seen in Fig. 1. In addition to this, bands or straps 7 are wrapped around the portions 3 and 5 at the bends 2, to hold the ends 6 in place adjacent to said bends. In this form, the portions 5 will not be as resilient as the portions 5 of the form shown in Fig. 1, and the ends 6 will therefore be forced against the object in a more positive manner, while the portions 5 of the form shown in Fig. 1 can yield slightly, due to the flexure of the loops comprising the handles.

Having thus described the invention, what is claimed as new is:—

1. A wrench of the character described bent from a length of stock and comprising a clamping loop to embrace an object, having outstanding handle portions at its ends, said handle portions having portions extending backwardly at the inner sides and in the plane thereof and terminating at the corresponding ends of said loops to abut and bind against said object.

2. A wrench of the character described bent from a length of stock, comprising a clamping loop to embrace an object extending through an arc of over 180 degrees, handle portions extending outwardly from the ends of said loop and forming bends between said loop and portions, and gripping portions extending inwardly from the outer ends of said handle portions at the inner sides and in the plane thereof and constituting the terminals of the stock, said gripping portions extending to said bends between the ends of the loop to abut and bind against the object.

In testimony whereof I have signed my name to this specification.

HENRY G. WERNIMONT.